(12) United States Patent
Magerl et al.

(10) Patent No.: US 9,481,048 B2
(45) Date of Patent: Nov. 1, 2016

(54) ENERGY CONVERSION METHOD AND APPARATUS, AND WELDING DEVICE

(75) Inventors: Christian Magerl, Langschlag (AT);
Jürgen Binder, Scharnstein (AT);
Walter Stieglbauer, Manning (AT);
Bernhard Artelsmair, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 1142 days.

(21) Appl. No.: 13/395,228

(22) PCT Filed: Sep. 9, 2010

(86) PCT No.: PCT/AT2010/000323
§ 371 (c)(1),
(2), (4) Date: Mar. 9, 2012

(87) PCT Pub. No.: WO2011/029113
PCT Pub. Date: Mar. 17, 2011

(65) Prior Publication Data
US 2012/0175356 A1    Jul. 12, 2012

(30) Foreign Application Priority Data
Sep. 10, 2009 (AT) .................. A 1425/2009

(51) Int. Cl.
*B23K 9/10* (2006.01)
*B23K 9/32* (2006.01)
*B23K 9/095* (2006.01)

(52) U.S. Cl.
CPC .............. *B23K 9/32* (2013.01); *B23K 9/0953* (2013.01); *B23K 9/1006* (2013.01)

(58) Field of Classification Search
CPC ...... B23K 9/06; B23K 9/073; B23K 9/0732; B23K 9/0734; B23K 9/095; B23K 9/0953; B23K 9/0956; B23K 9/10; B23K 9/1012; B23K 9/1043; H02J 7/0047; H02J 2007/005
See application file for complete search history.

(56) References Cited

U.S. PATENT DOCUMENTS

| 6,051,957 A | 4/2000 | Klein |
| 2002/0101218 A1* | 8/2002 | Koenck et al. ............... 320/140 |

(Continued)

FOREIGN PATENT DOCUMENTS

| DE | 26 50 522 | 5/1978 |
| GB | 2 316 244 | 2/1998 |

(Continued)

OTHER PUBLICATIONS

International Search Report of PCT/AT2010/000323, date of mailing Jan. 18, 2011.
Austrian Office Action in A1425/2009 dated Jul. 28, 2010 with English translation of relevant parts.

*Primary Examiner* — Dana Ross
*Assistant Examiner* — Brandon Harvey
(74) *Attorney, Agent, or Firm* — Collard & Roe, P.C.

(57) ABSTRACT

The invention relates to a method and an apparatus for converting the energy of an energy storage (2) for operating an arc (6), wherein a power unit (3) and an input and/or output device (5) for setting the current for operating the arc (6) is used to convert energy, as well as an appropriate welding device. In order to be able to provide the user with information on the state of energy storage (2), the time remaining for operating the arc (6) using the set current is calculated depending on a determined capacity of the energy storage (2) and a value for the current set on the input and/or output device (5), and said time is displayed on a corresponding display unit (27).

10 Claims, 3 Drawing Sheets

(56) References Cited

U.S. PATENT DOCUMENTS

| | | |
|---|---|---|
| 2005/0109748 A1 | 5/2005 | Albrecht et al. |
| 2007/0181547 A1 | 8/2007 | Vogel et al. |
| 2009/0008374 A1 | 1/2009 | Fosbinder |

FOREIGN PATENT DOCUMENTS

| | | |
|---|---|---|
| JP | 10-272563 | 10/1998 |
| JP | 2000-209784 | 7/2000 |
| JP | 2003-028939 | 1/2003 |

* cited by examiner

ENERGY CONVERSION METHOD AND APPARATUS, AND WELDING DEVICE

CROSS REFERENCE TO RELATED APPLICATIONS

This application is the National Stage of PCT/AT2010/000323 filed on Sep. 9, 2010, which claims priority under 35 U.S.C. §119 of Austrian Application No. A 1425/2009 filed on Sep. 10, 2009, the disclosure of which is incorporated by references. The international application under PCT article 21(2) was not published in English.

The invention relates to a method for converting the energy of an energy storage for operating an arc, wherein a power unit and an input and/or output device for setting the current for operating the arc are used to convert energy.

The invention further relates to an apparatus for converting the energy of an energy storage for operating an arc having a power unit for converting energy and an input and/or output device for setting the current for operating the arc.

Finally, the invention also relates to a welding device including an energy storage, a torch for generating an arc, an input and/or output device, and an apparatus for converting the energy of the energy storage for operating the arc.

In order to enhance mobility, it is generally understood to use energy storages as power supply for supplying the electronic system or power electronics of an appropriate device with electronic energy such that the application can be carried out using said device. Due to the limited energy thereof the energy storage must be recharged regularly.

The use of energy storages in devices for metal processing, such as in welding devices, is for example known from specifications DE 26 50 522 A1 and GB 2 316 244 A.

US 2005/0109748 A1 describes a welding device having an energy storage for generating welding energy or the arc, respectively. The voltage of the energy storage is transformed to an intermediate voltage by means of a step-up converter, which in turn is stepped down to the voltage required for the arc by means of a downstream step-down converter. The energy storage can be recharged using a charging device. Said charging device is an independent unit, which can either be integrated in the welding device or can be connected to the energy storage as an external unit. It is disadvantageous that the energy for the arc is generated in two steps, whereby switching losses occur within both the step-up converter and the step-down converter, and thereby the degree of efficiency is decreased. Additionally, the step-down converter is required to convert the stepped-up intermediate voltage to the arc voltage, such that switching losses are increased due to the larger voltage difference.

US 2009/008374 A1 and US 2007/181547 describe portable battery-operated welding devices, in which the battery state of charge is displayed.

Also, JP 10-272563 A and JP 2003-028939 A describe portable battery-operated welding devices, in which information on the battery charge capacity relevant for the user is provided.

The object of the present invention is the creation of an above mentioned method and an above mentioned apparatus by which the user can be informed on the state of the energy storage. Disadvantages of known methods and apparatuses should be avoided or at least be reduced.

Another object of the invention is the creation of a welding device and a method that can be performed therewith, by which the user can be provided with an ideal energy management for using the limited energy of the energy storage.

The object of the invention is solved by a method mentioned above, in which the time remaining for operating the arc is calculated and displayed with the set current depending on a determined capacity of the energy storage and a value for the current set on the input and/or output device. In case of operating the arc for a welding device said parameter would be the remaining welding time, which is the time still remaining for welding when the current is set. Here it is advantageous that when starting the apparatus the user already gets the first information on how long the energy storage can still be used, that is how long the user is able to weld.

Advantageously, said information, which is based on a calculated value, is adjusted or extrapolated and displayed during the operation of the arc, that is while consuming energy.

If the adjustment of the value of the remaining time is performed in defined time intervals and the respective value of the remaining time is stored, then when starting or changing the current for operating the arc a more accurate calculation can significantly be carried out due to the stored values.

Another advantage is the use of energy storages having controllers, whereby the accuracy of calculations is increased.

The present object is also solved by an apparatus mentioned above, wherein a device for calculating a value of the time remaining for operating the arc is provided depending on a determined capacity of the energy storage and a value for the current for operating the arc set on the input and/or output device, and a display unit for displaying the calculated value of the time remaining. Advantages arising therefrom and further ones can be found in the advantages already described and in the following description.

Advantageously, a device for recharging the energy storage is provided, such that a charge process of the energy storage can be performed quickly and conveniently depending on the information transmitted to the user.

On the input and/or output device a light emitting diode for displaying the charging state of the energy storage is provided.

Further, a setting element for turning the charging device on and off can be provided on the input and/or output device.

Finally, the present object is also solved by a welding device mentioned above, designed to perform an above mentioned method or having an above mentioned apparatus.

The present invention is explained in more detail with the help of the attached schematic drawings. In which.

Introductorily it is noted that same parts of the embodiment are denoted with same reference characters.

Figure 1:
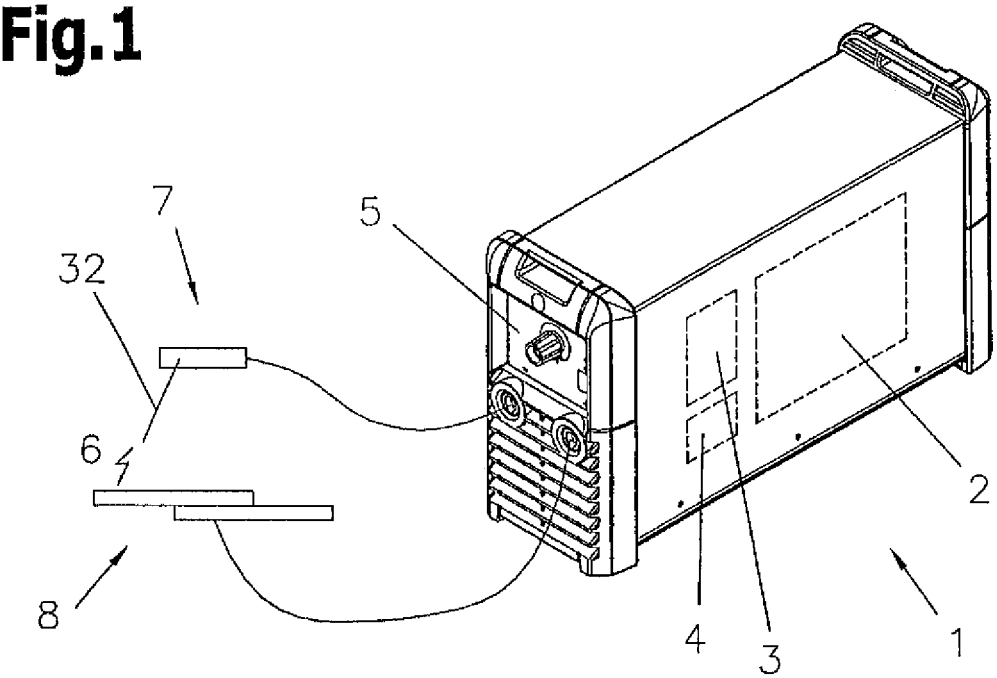
FIG. 1 is a schematic illustration of a welding device.

In FIG. 1 a device 1 is shown, which comprises at least one energy storage 2, a power unit 3, a control device 4 and an input and/or output device 5. Device 1 is designed for forming an arc 6, which is controlled by control device 4. Thus, device 1 can for example be used as welding device, cutting device, cleaning device or soldering device. Details of such devices 1, such as cooling of a torch 7, will not be explained in more detail, because this is generally known from prior art.

The current for arc 6 is generated between an electrode 32 displaced in torch 7 or held in an electrode holder, respectively, and a workpiece 8. Workpiece 8, formed of several parts, is also connected to device 1. Accordingly, the current is provided from power unit 3 supplied by energy storage 2. Furthermore, the current and further parameters, if applicable, can be adjusted or controlled on the input and/or output device 5. For that purpose the input and/or output device 5 is connected to control device 4. Preferably, power unit 3 is at the output provided with ports or bushes, via which torch 7 or workpiece 8 can be connected. Thus, power unit 3 converts the energy stored in energy storage 2 such, that for example a welding process can be performed as described in the following embodiment.

The energy, which due to energy storage 2 is available to a limited extent is provided to arc 6 with minimum switching losses, by using a step-down converter for operating the arc 6 as power unit 3, and by performing the switching procedures of at least one switch 9 of step-down converter connected to energy storage 2 in a snubbed way. For that purpose a snubber circuit 10 for performing snubbed switching procedures is integrated in the step-down converter.

Figure 2:
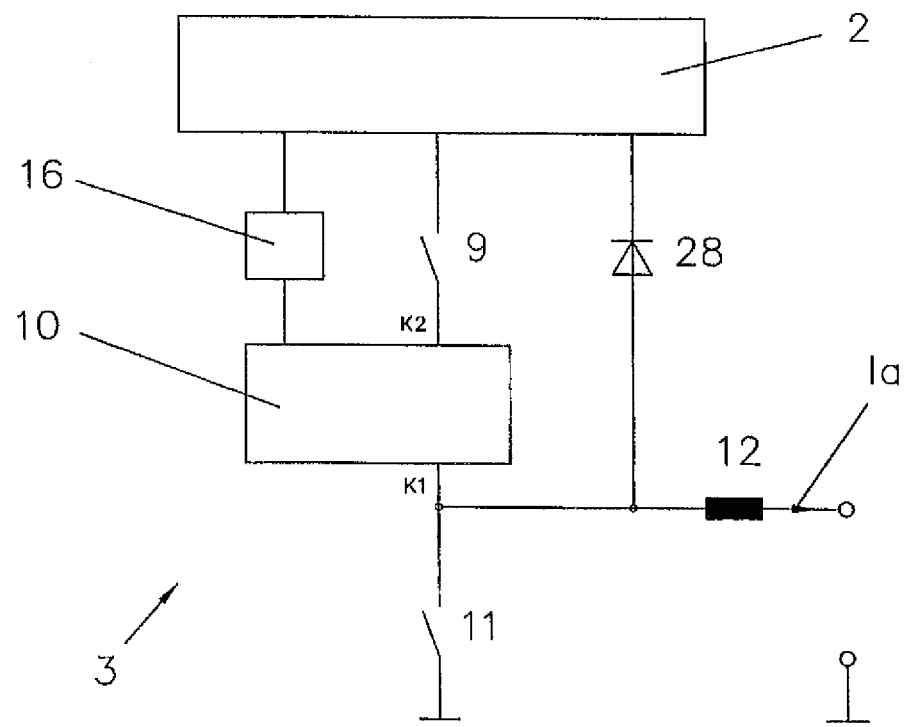
FIG. 2 is a schematic block diagram of an apparatus for converting the energy of an energy storage for operating an arc.
Figure 3:
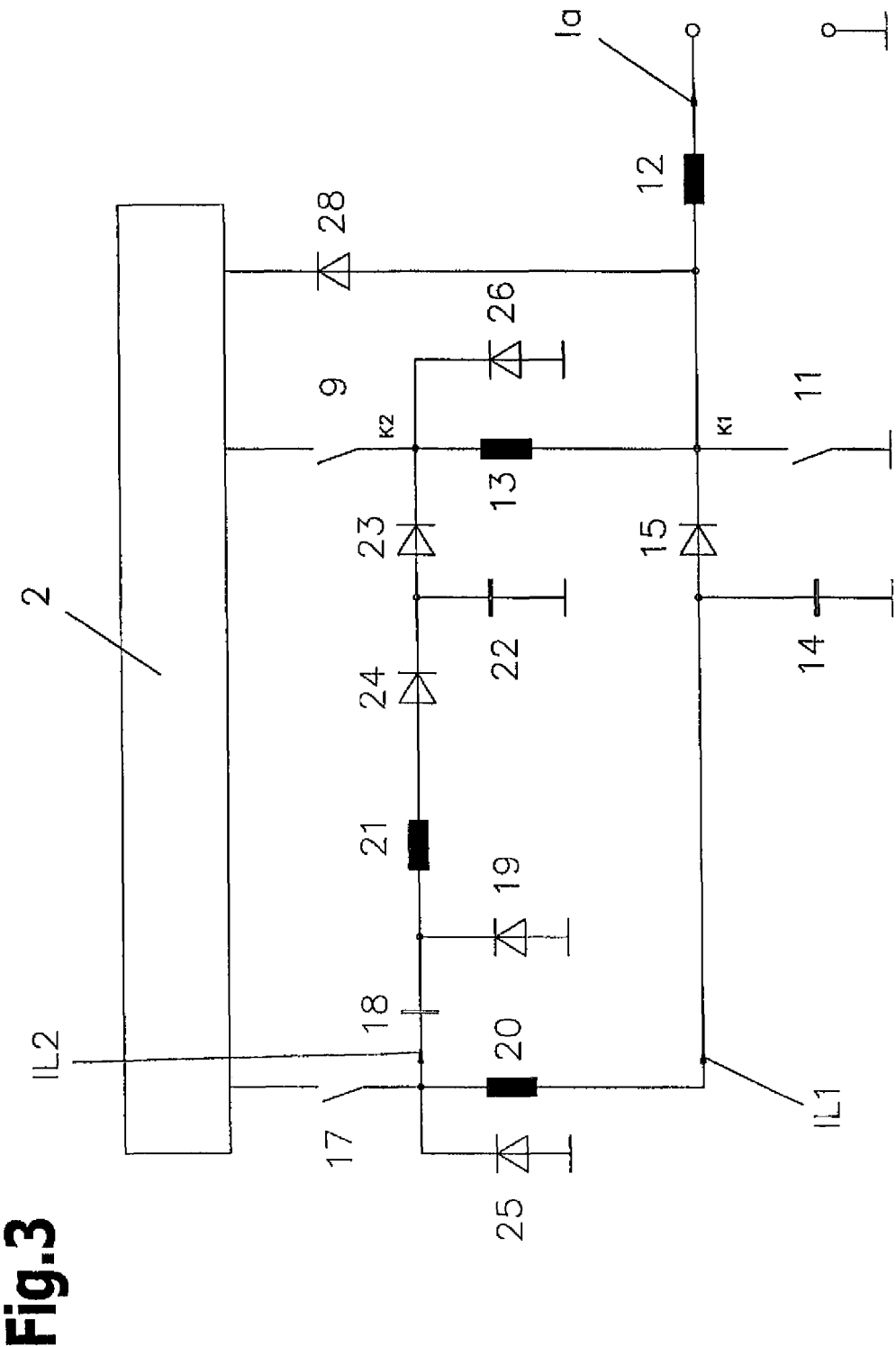
FIG. 3 is a diagram of such a converting apparatus.

Now, power unit 3 including the integrated snubber circuit 10 is described with the help of FIGS. 2 and 3. The basic components of the step-down converter are the switches 9 and 11 as well as inductor 12. This is also called a synchronous converter being used as synchronous step-down converter. In order to generate the energy for arc 6 in an efficient way, that is with a degree of efficiency in the range of 99%, switch 9 is wired with the snubber circuit 10 such that both switch-on snubbing in switch-on-procedures and also switch-off snubbing in switch-off procedures are resulting. This way very little energy is converted into heat and, thus, only minimum cooling of the electronics of power unit 3 is required. Thus, the required space of power unit 3 is also reduced to a minimum.

In this embodiment the snubber circuit 10 is realized with storage components, such as capacitors and inductors, as well as diodes. In general, the diodes control the direction of the electric current, whereby the energy of energy storage 2 can be converted with minimum switching losses in switching operations of at least switch 9 into the energy required for arc 6 of a welding process, cutting process or cleaning process.

The switch-on snubber is divided into two circuits, wherein a first circuit is formed by inductor 13 connected in series to switch 9, and a second circuit is built up of capacitor 14 and diode 15. The second circuit is actively controlled by a control unit 16. The first circuit is indirectly actively controlled via the second circuit, such that all in all active switch-on snubbing is resulting.

Control unit 16 is in the simplest form thereof formed by a switch 17, which is like switch 9 on the input side thereof connected to energy storage 2. In this case switch 17 is also snubbed accordingly. Specifically, switch-off snubbing is effected via capacitor 18 and diode 19, and switch-on snubbing via inductors 20 and 21.

Switch-off snubbing for switch 9 is effected like with switch 17 via capacitor 22 and diode 23. Diode 23 inhibits an uncontrolled charging of capacitor 22 via switch 9 when switch 9 is switched on.

A snubbing for switch 11 is not required, because it is automatically resulting from the basic functional principle of the synchronous step-down converter as generally known from prior art.

The function of switch-on and switch-off snubbing in switching procedures, which are actively controlled by control device 4 of welding device 1 according to the control of synchronous converter, is described in detail based on the following initial situation:
switch 9 open, switch 11 closed; capacitors 14, 18 and 22 as well as inductors 20, 21 and 13 discharged.

According to said initial situation the output current Ia or welding energy is supplied via electric circuit formed of switch 11 and inductor 12, the voltage on switch 11 being substantially zero. Following, inductor 12 is discharged. In order to recharge inductor 12 in the next step, switch 9 is turned on and switch 11 is snubbed and switched-off.

When switching on switch 9 the switch-on snubber operates according to the invention such that when switching on self-capacitance of switch 9 has to be recharged only. Thus, only low, nearly insignificant switch-on losses are resulting. This is achieved by the inductor 13 connected in series to switch 9, which limits the rise in current when switching-on such, that the rise in current occurs continuously according to the dimensioning of inductor 13. Thus, the minimum switching losses are only caused by a fractional amount of output current Ia.

Said rise in current continues as long as the current flowing through inductor 13 is as large as the output current Ia. That means that due to current limitation the output current Ia flows entirely time-delayed to the outlet through switch 9. Thus, current is no longer flowing to the output via a diode 15 connected in parallel to switch 11, such that a capacity 14 is recharged in parallel to switch 11. In the simpliest case said diode 15 and said capacity 14 are part of a power transistor forming switch 11. Recharging is performed via inductor 13 connected in series to said capacity 14. This causes the voltage at node K1 to increase time-delayed and continuously or slowly up to the supply voltage, that is the voltage of energy storage 2.

Furthermore, by this slow increase of voltage, voltage peaks both on switch 9 and on switch 11 are avoided, such that a short-term, undesired switching of switch 9 or 11 is prevented. In particular, it is prevented that with switch 9 switched on switch 11 is also turned on. Here it is spoken of a so-called "conductive phase", in which the welding energy is directly supplied by energy storage 2. This is the case, if the supply voltage is applied at node K1.

During the "conductive phase" appropriate preparations for the following switch-off snubbing and also for the next switch-on snubbing has to be made. During a "recharge phase" taking place within "conductive phase" capacitors 14, 18 and 22 are charged by activating control unit 16, that is switching on switch 17. The first possible point in time for activation of control unit 16 is that, when the supply voltage is applied at node K1. Switch 17 remains switched on as long as half supply voltage is applied at capacitor 14. Furthermore, the capacitors 22 and 18, which are smaller in dimension than capacitor 14, are fully charged during this time via inductor 21 and diode 24. Said inductor 21 and diode 24 are arranged between capacitor 18 and capacitor 22 such that both capacitors 18, 22 are charged with the same charging current IL2. Inductor 21 controls charging time of the equally dimensioned capacitors 18 and 22 such that they are charged simultaneously and identically up to the supply voltage. Capacitors 18 and 22 are at most charged in a time required to reach half supply voltage at capacitor 14.

Dimensioning of inductor 21 is performed accordingly. Furthermore, inductor 21 and diode 24 cause the capacitors 18 and 22 to be connected in series during charging. In order to achieve switch-off snubbing the capacitor 18 and diode 19 or the capacitor 22 and diode 23, however, operate independently from one another.

During this time energy is also stored within inductor 20 connected in series to switch 17 corresponding to charging current IL1 of capacitor 14.

Switch 17 is switched off after capacitors 18 and 22 are fully recharged and half supply voltage is applied at capacitor 14. Charged capacitor 18 and diode 19 function as switch-off snubber for switch 17, since when switching the supply voltage is also applied on the output side by capacitor 18 and thereby switch 17 can be switched off or opened with significantly zero-potential or without potential difference. Then full discharge of capacitor 18 is effected to capacitor 14 or output via inductor 20. Thus, due to inductor 21, diode 19 and diode 25 this intermediately-stored energy will not be lost. Capacitor 18 is discharged, while capacitor 22 is further kept on supply voltage.

Switching off switch 17 capacitor 14 is recharged up to supply voltage with the energy stored within inductor 20. This is performed via the electric circuit formed of inductor 20, capacitor 14 and diode 25. Inductor 20 is dimensioned such that during switch-on time of switch 17 enough energy is stored, in order to recharge capacitor 14 up to supply voltage when switch 17 is switched off.

Finally, reaching supply voltage at capacitor 14, the "recharge phase" within "conductive phase" is also completed. Thus, the "conductive phase" can also be completed, since it is provided for switch-off snubbing for switch 9. Additionally, the removal of energy from inductor 13 is also provided for, such that when switching off switch 9 the switch-on snubbing is also nearly simultaneously provided for the next switch-on procedure of switch 9.

When switching off switch 9 switch-off snubbing is performed like with switch 17, by providing the supply voltage on the output side at switch 9 or node K2 due to charged capacitor 22 and via diode 23, such that no voltage drop or potential difference at switch 9 is significantly resulting and it can, thus, be switched off without loss.

Thus, no current is flowing from energy storage 2 into inductor 13 via switch 9 such that the energy stored therein can also be significantly fully discharged. This is performed such that by fully discharging capacitor 22 the voltage at node K2 decreases continuously to outlet via diode 23. Also, when switching off switch 9 capacitor 14 is discharged, which affects the voltage at node K1. The voltage at node K1 decreases slower than at node K2 due to the larger capacitor 14 compared to capacitor 22. Thus, to inductor 13 a so-called negative voltage-time-area is applied, whereby the current decreases due to inductor 13, because the polarity of voltage at inductor 13 inverts according to the capacitor 22 which was being discharged earlier. Thus, the potential at node K2 or on the output side of switch 9 is significantly zero after discharging capacitor 22, said potential at node K2 being maintained by diode 26. The negative voltage-time-area at inductor 13 causes the current resulting from discharge of inductor 13 to be supplied to output. Thus, the energy of inductor 13 and capacitor 14 is supplied to output current Ia significantly without losses. Thus, switch-on snubber is again available for the next switch-on procedure of switch 9. Accordingly, switching off switch 9 switch 11 is in turn switched on such that output current Ia is not interrupted. Specifically, this occurs when the voltage at node K1 significantly dropped to zero. Thus, switch-on snubbing is provided. Hence, the initial situation is reproduced. This is repeated as long as welding energy is required.

Since power unit 3 is particularly used for providing welding energy from an energy storage 2, limited energy according to the capacity of energy storage 2 is available to the user.

Figure 4:
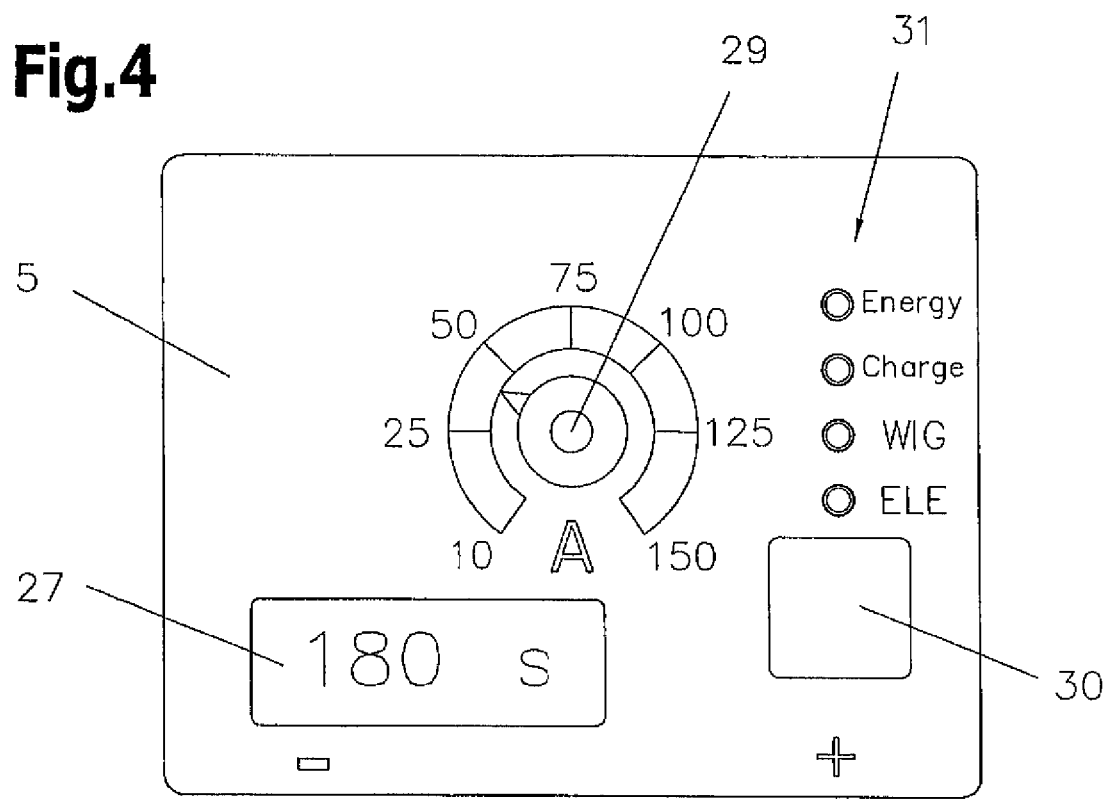
FIGS. 4 and 5 are schematic illustrations of an input and/or output device of a welding device designed according to the invention.
Figure 5:
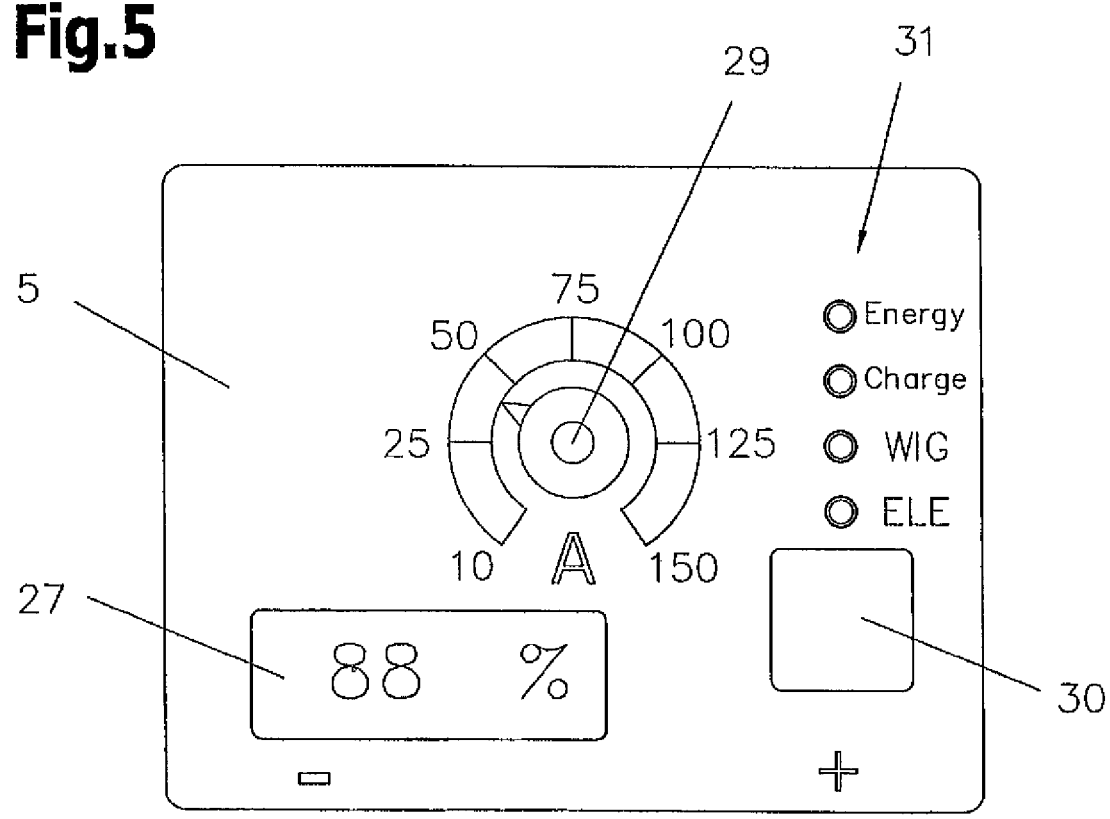

Thus, according to the invention the available energy or parameters derived therefrom are displayed on a display unit 27 according to FIGS. 4 and 5 on the input and/or output device 5. Preferably, it is calculated from the capacity of energy storage 2 and the current for generating the arc 6 set using setting element 28 how long the energy for said current will suffice. The calculation of a parameter, particularly the time available, that is the remaining time, is for example performed as described in the following.

In energy storages 2 according to prior art often so-called "state of charge" (SOC) and/or "state of health" (SOH) controllers are integrated. According to control device 4 of apparatus 1 said controllers particularly deliver the current charging state, which significantly corresponds to the capacity of energy storage 2. Furthermore, control device 4 also knows the current set for arc 6. Said current is required, since the capacity of energy storage 2, that can be used effectively, strongly depends on the applied load. The applied load corresponds to the set current. For example, in welding with a high welding current the capacity of energy storage 2 is depleted faster than in a welding with a middle or low welding current. Thus, the capacity of energy storage 2 and the current for operating arc 6 serve as a basis for the calculation.

For example, when starting apparatus 1 the time the set current can be worked with is calculated from current and capacity, and is displayed on display unit 27. This is called the remaining time or in case of a welding device the remaining welding time. When the current for operating arc 6, particularly the welding current, is altered, than the remaining welding time is also adjusted accordingly. Since a welding process was not yet performed when starting a welding device, the displayed remaining welding time serves as a reference value only. Here, the actual energy consumption has not been taken into account yet. This particularly depends on the length of arc 6, the welding electrode 32 used, the appropriate welding application, etc.

When a welding process is performed, control device 4 calculates the actual energy consumption over a certain time based on the actual values of welding current and welding voltage or current and voltage of energy storage 2. Based on said previous energy consumption the future energy consumption can be extrapolated and, thus, the remaining welding time, that is the time welding is still possible, can be adjusted and the new value can be displayed on display unit 27. This can be done in regular time intervals, such as every five, thirty or sixty seconds during the operation of arc 6. Preferably, the at last calculated remaining welding time is displayed on display unit 27 as long as a new welding process is started, the welding current is changed or apparatus 1 is switched off.

Further, at least the at last calculated value can be stored such that when starting the apparatus the next time said value is displayed on display unit 27.

In order to perform the calculation of the remaining welding time still more accurately, the actual values detected in regular time intervals are for example stored during a welding process. Thus, following the welding process the energy consumed during the welding process can be calculated therefrom, said value of energy consumption being assigned to the set welding current during the welding process. When a welding process is performed several times using the same set welding current, an average value of the energy consumption can be taken. Since for every welding process performed the required welding time is also stored, said time can also be averaged. This way a library can quasi be created, in which an average value of the energy consumption can for example be stored over a defined time for a plurality of possible settings of the welding current. Such a library can accordingly be updated with every welding process performed. This way it is achieved that when starting welding device 1 or when changing welding current the energy consumption due to set welding current is significantly known from empirical values of said library. Thus, from the capacity of energy storage 2 and the energy consumption per welding process stored in the library it can be calculated how many welding processes can be performed using the set welding current and the available capacity of the energy storage 2. Since corresponding to energy consumption the associated welding time is also stored in the library, the remaining welding time can be calculated and displayed on display unit 27.

The remaining welding time is, thus, calculated or determined iteratively, since the energy still available and the current energy consumption are taken into account in regular time intervals. Thus, the remaining welding time displayed on display unit 27 is also updated regularly such that a relatively accurate information on the energy storage 2 is available.

Of course, the display of remaining welding time described can also be used for similar functions. Specifically, this is the case, when energy storage 2 is not combined with a module for welding, but for example with an inverter module or an instrument module.

It is a further advantage when there is a possibility for charging the energy storage 2. When a synchronous step-down converter is used as power unit 3, then it can also be used to charge energy storage 2 by operating the synchronous converter as step-up converter. Synchronous step-down converter is operated in reverse direction by interchanging input and output. Thus, for the operation of step-up converter according to FIG. 2 switch 11, inductor 12 and diode 28 are important. When the function of diode 28 is replaced by a switch, this is called synchronous step-up converter. Thus, switch 11 is employed in both operation modes of the synchronous converter, such that a different control is required for the respective operation mode. For example, control of switch 11 for operating as step-up converter is activated by activating a charge mode (Charge) with a setting element 30 according to FIGS. 4 and 5 on the input and/or output device 5. The activated charge mode is for example indicated by a light-emitting diode 31.

Thus, in activated charge mode the basic requirement that energy storage 2 can be charged is fulfilled. Therefore, it is required to connect an appropriate voltage source. This is performed on the output of the synchronous step-down converter, in this case functioning as the input of the synchronous step-up converter. Specifically, when the power unit 3 is used in a welding device, then the welding jacks are the output. As voltage source the battery of a vehicle can for example be used. In the area of the welding jacks an inverse-polarity protection can be provided such that power unit 3 is protected when connecting the voltage source.

According to the generally known function of a step-up converter the voltage of voltage source has to be lower than the voltage of energy storage 2.

Following activation of charge mode and connection of voltage source the energy storage 2 is charged. Therefore, switch 11 is triggered such that voltage of voltage source is stepped up to the voltage of energy storage 2. Accordingly, the charging current for energy storage 2 is flowing to energy storage 2 via diode 28, the above-mentioned possible SOC and/or SOH controller providing for an equal charging of individual cells of energy storage 2. The charging state is monitored by SOC and/or SOH controllers and communicated to control device 4. Thus, the charging state can for example be displayed on display unit 27. Accordingly, the charging process is automatically terminated by control device 4 once energy storage 2 is fully charged. Accordingly, this is displayed on the input and/or output device 5 of display unit 27 or by means of one of the light emitting diodes 31 (Energy). For example, the light emitting diode 31 (Energy) lights up red when energy storage 2 has to be charged, or green when energy storage 2 is fully charged. Thus, it is possible to change the charge mode back into the welding mode (WIG or ELE) by using setting element 30.

Of course, the welding device can also have an appropriate connection via which energy storage 2 can be charged using a charging device. In this case the mode of operating the synchronous converter as step-up converter is not required.

It is further possible to have an additional output arranged on apparatus 1, particularly welding device, in the form of a low voltage socket which is preferably connected in parallel to the welding outputs or welding jacks on power unit 3, i.e. that on welding device 1 an output for supplying additional consumers is arranged. Thus, further consumers, such as lamps, neon tubes, cutoff grinding tools, particularly flex modules, glue guns, drilling machines or drilling modules, jigsaws or jigsaw modules, etc., can be connected.

Of course, in apparatus 1 or welding device a step-up converter and DC/AC module can be arranged and, thus, the additional output can be designed as an alternating voltage output, particularly a 240 volts socket. One or more low voltage outputs and one alternating voltage output can be arranged on apparatus 1, particularly welding device, and, thus, further devices operated with corresponding voltage can be directly connected to apparatus 1. When such additional devices are connected and used, the energy consumption thereof can also be determined and indicated as previously described. So it is possible to have a general display of the energy still available and/or a display for the time period of one or more welding processes such that the user is able to use the existing energy ideally.

The advantage of such a design of apparatus 1 or welding device is that the user is now provided with a welding device for joining materials, whereto still additional devices for further tasks, such as separating materials, can be connected, a common power supply being present.

The invention claimed is:

1. A welding device comprising:
   an energy storage,
   a torch for forming an arc,
   an input and/or output device connected to a control device for setting a welding current,
   a power unit to convert an energy of the energy storage for operating the arc,
   wherein the control device is designed for
   calculating a reference value of a welding time remaining for performing a welding process depending on a determined capacity of the energy storage and a value for the welding current set on the input and/or output device before performing the welding process, adjusting a remaining welding time according to a change in the welding current at the input and/or output device, adjusting the calculated remaining welding time while performing the welding process based on the actual values of the welding current and a welding voltage, creating a library in which an average value of energy consumption for a plurality of welding current settings is stored as an empirical value, updating the library with every welding process performed with the welding device, and calculating a number of welding processes which can be performed with an available capacity of the energy storage using a set welding current based on the available energy capacity of the energy storage and the empirical value of energy consumption for the particular welding process and the set welding current stored in the library and a display unit for displaying a calculated value of the remaining welding time.

2. The welding device according to claim 1, wherein the control device is designed for calculating a value of the remaining welding time in defined time intervals, and a store for storing the respective values of the remaining welding time is provided.

3. The welding device according to claim 1, wherein at least one controller of the energy storage is provided, that can be used to determine a capacity of the energy storage.

4. The welding device according to claim 1, wherein a unit for charging the energy storage is provided.

5. The welding device according to claim 4, wherein a light emitting diode for displaying a charging state of the energy storage is provided on the input and/or output device.

6. The welding device according to claim 4, wherein a setting element for turning the unit on and off is provided on the input and/or output device.

7. A method for operating a welding device for forming an arc having an energy storage, the method comprising the steps of:

connecting a power unit and an input and/or output device to a control device for setting a welding current;

using the power unit and the input and/or output device to convert the energy of the energy storage;

when starting the welding device via the control device, calculating and displaying a reference value for a welding time remaining for operating the welding device using a set current depending on a determined capacity of the energy storage and a value of the welding current set on the input and/or output device before performing a welding process;

adjusting a remaining welding time accordingly in case of a change in the welding current on the input and/or output device, wherein the remaining welding time is adjusted while performing the welding process based on the actual values of the welding current and a welding voltage;

creating a library in which an average value of energy consumption for a plurality of welding current settings is stored as an empirical value;

updating the library with every welding process performed with the welding device; and calculating a number of welding processes which can be performed with an available capacity of the energy storage using a set welding current based on the available energy capacity of the energy storage and the empirical value of energy consumption for the particular welding process and the set welding current stored in the library.

8. The method according to claim 7, wherein the step of adjusting the remaining welding time is performed in defined time intervals and a respective value of the remaining welding time is stored.

9. The method according to claim 8, wherein the value of the remaining welding time is calculated depending on stored values of an energy consumption for the set welding current.

10. The method according to claim 7, wherein a capacity of the energy storage is determined by retrieving at least one controller of the energy storage.

* * * * *